(12) United States Patent  
Park et al.

(10) Patent No.: US 8,339,626 B2  
(45) Date of Patent: Dec. 25, 2012

(54) IMAGE FORMING APPARATUS AND CONTROLLING METHOD THEREOF

(75) Inventors: Man-suk Park, Seoul (KR); Kyu-sung Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 381 days.

(21) Appl. No.: 12/659,731

(22) Filed: Mar. 18, 2010

(65) Prior Publication Data

US 2011/0058206 A1    Mar. 10, 2011

(51) Int. Cl.
  *G06F 15/00* (2006.01)
  *G06F 3/12* (2006.01)
  *G06K 1/00* (2006.01)
  *G06K 15/00* (2006.01)

(52) U.S. Cl. ................. 358/1.13; 358/1.14

(58) Field of Classification Search .............. None
  See application file for complete search history.

(56) References Cited

U.S. PATENT DOCUMENTS 7,908,502 B2    3/2011  Park
2008/0031641 A1*  2/2008  Kaseno et al. ........... 399/9
2008/0034240 A1    2/2008  Park
2010/0268973 A1    10/2010  Park
2011/0138201 A1    6/2011  Park

FOREIGN PATENT DOCUMENTS

JP   2002-333933      11/2002
KR   10-2008-0012548   2/2008

OTHER PUBLICATIONS

Korean Office Action mailed Jan. 4, 2012 issued in corresponding Korean Patent Application No. 10-2010-0055575.

* cited by examiner

*Primary Examiner* — Douglas Tran
(74) *Attorney, Agent, or Firm* — Staas & Halsey LLP

(57) ABSTRACT

An image forming apparatus includes an engine unit to execute an image forming job, a determination unit to repeatedly determine whether the image forming apparatus is in a standby state or not, based on whether the standby state to wait for execution of the image forming job is maintained for a predetermined time or not, and a controller to control the image forming apparatus to operate in a first power saving mode if it is determined that the image forming apparatus is in the standby state, wherein, in the first power saving mode, information stored in a volatile memory is copied to an internal memory and operation frequencies of a CPU, the volatile memory, and an intellectual property are lowered. Accordingly, power consumption in the standby state is reduced in a stepwise manner.

21 Claims, 7 Drawing Sheets

IMAGE FORMING APPARATUS AND CONTROLLING METHOD THEREOF

CROSS-REFERENCE TO RELATED APPLICATIONS

This application claims the benefit of Korean Patent Application No. 10-2009-84312, filed on Sep. 8, 2009, in the Korean Intellectual Property Office, the disclosure of which is incorporated herein by reference.

BACKGROUND

1. Field

Aspects relate to an image forming apparatus and a controlling method thereof, and more particularly, to an image forming apparatus which is capable of reducing power consumption in a standby state and a controlling method thereof.

2. Description of the Related Art

An image forming apparatus refers to an apparatus which generates, prints, receives, and transmits image data, and includes a printer, a scanner, a copier, a facsimile machine and a multifunction peripheral (MFP) incorporating the functions of the aforementioned devices into a single device.

Recently, an attempt to reduce power consumption in a normal operation state in which the image forming apparatus normally operates is made along with an attempt to reduce power consumption in a standby state in which the image forming apparatus does not perform a specific operation, that is, to reduce standby power.

The standby power refers to power which is always consumed regardless of the normal operation of the image forming apparatus. Currently, there is a movement to limit such standby power within a specific range as a policy and reducing the standby power is of importance to the extent that a product requiring high standby power will be prohibited from being manufactured in the future.

Therefore, there is a necessity to reduce standby power during a process in which a normal operation state is converted into a standby state or vice versa.

SUMMARY

Aspects provide an image forming apparatus which determines whether it is in a standby state or not and enters standby modes of different power consumption levels in a stepwise manner according to a result of determination, and a controlling method thereof.

According to an aspect, there is provided an image forming apparatus including: an engine unit to execute an image forming job, a determination unit to determine whether the image forming apparatus is in a standby state or not, based on whether the standby state to wait for execution of the image forming job is maintained for a predetermined time or not, and a controller to control the image forming apparatus to operate in a first power saving mode if it is determined that the image forming apparatus is in the standby state, wherein, in the first power saving mode, information stored in a volatile memory is copied to an internal memory and operation frequencies of a CPU, the volatile memory, and an intellectual property are lowered.

The determination unit may repeatedly determine whether the image forming apparatus is in the standby state or not.

According to the repetitive determination, if it is determined that the standby state to wait for execution of the image forming job is maintained for a predetermined time after the image forming apparatus operates in the first power saving mode, the controller may control the image forming apparatus to operate in a second power saving mode in which the CPU is set to use the information copied to the internal memory and the volatile memory enters an idle mode.

According to the repetitive determination, if it is determined that the standby state to wait for execution of the image forming job is maintained for a predetermined time after the image forming apparatus operates in the second power saving mode, the controller may control the image forming apparatus to operate in a third power saving mode in which power supplied to the volatile memory and an operation module is interrupted and the operation frequency of the CPU is lowered.

The image forming apparatus may further include a PLL unit to generate operation frequency and provide the operation frequency to the CPU, the volatile memory, and the intellectual property.

The internal memory may be a memory that stores information necessary for driving the intellectual property in a normal state in which the image forming job is executed, and, in the first power saving mode, information stored in the volatile memory of the normal state may be copied to the internal memory.

The determination unit may determine whether an external signal requesting the image forming apparatus to operate in a normal state to execute the image forming job is input or not, and, if it is determined that the external signal indicates the normal state, the controller may change the operation frequencies of the CPU and the volatile memory to normal operation frequencies in response to the external signal.

The determination unit may determine whether an external signal requesting the image forming apparatus to operate in a normal state to execute the image forming job is input or not, and, if it is determined that the external signal indicates the normal state, the controller may change the operation frequencies of the CPU and the volatile memory to normal operation frequencies, and may set the volatile memory to be in an operation mode in response to the external signal.

The determination unit may determine whether an external signal requesting the image forming apparatus to operate in a normal state to execute the image forming job is input or not, and, if it is determined that the external signal indicates the normal state, the controller may change the operation frequencies of the CPU and the volatile memory to normal operation frequencies, supply power to the volatile memory and the operation module, and copy information necessary for operating in the normal state from the non-volatile memory to the volatile memory.

According to another aspect, there is provided a controlling method of an image forming apparatus, including: determining whether the image forming apparatus is in a standby state or not, based on whether the standby state to wait for execution of an image forming job is maintained for a predetermined time or not, and if it is determined that the image forming apparatus is in the standby state, entering a first power saving mode in which information stored in a volatile memory is copied to an internal memory and operation frequencies of a CPU, the volatile memory, and an intellectual property are lowered.

In the determining operation, it may be repeatedly determined whether the image forming apparatus is in the standby state or not.

According to the repetitive determination, if it is determined that the standby state to wait for execution of the image forming job is maintained for a predetermined time after the image forming apparatus operates in the first power saving mode, the entering may include entering a second power saving mode in which the CPU is set to use the information copied to the internal memory and the volatile memory enters an idle mode.

According to the repetitive determination, if it is determined that the standby state to wait for execution of the image forming job is maintained for a predetermined time after the image forming apparatus operates in the second power saving mode, the entering may include entering a third power saving mode in which power supplied to the volatile memory and an operation module is interrupted and the operation frequency of the CPU is lowered.

The internal memory may be a memory that stores information necessary for driving the intellectual property in a normal state in which the image forming job is executed, and, in the first power saving mode, information stored in the volatile memory may be copied to the internal memory.

The controlling method may further include: determining whether an external signal requesting the image forming apparatus to operate in a normal state to execute the image forming job is input or not, and, if it is determined that the external signal indicates the normal state, changing the operation frequencies of the CPU and the volatile memory to normal operation frequencies in response to the external signal.

The controlling method may further include: determining whether an external signal requesting the image forming apparatus to operate in a normal state to execute the image forming job is input or not, and, if it is determined that the external signal indicates the normal state, changing the operation frequencies of the CPU and the volatile memory to normal operation frequencies, and setting the volatile memory to be in an operation mode in response to the external signal.

The controlling method may further include: determining whether an external signal requesting the image forming apparatus to operate in a normal state to execute the image forming job is input or not, and, if it is determined that the external signal indicates the normal state, changing the operation frequencies of the CPU and the volatile memory to normal operation frequencies, supplying power to the volatile memory and the operation module, and copying information from the non-volatile memory to the volatile memory.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
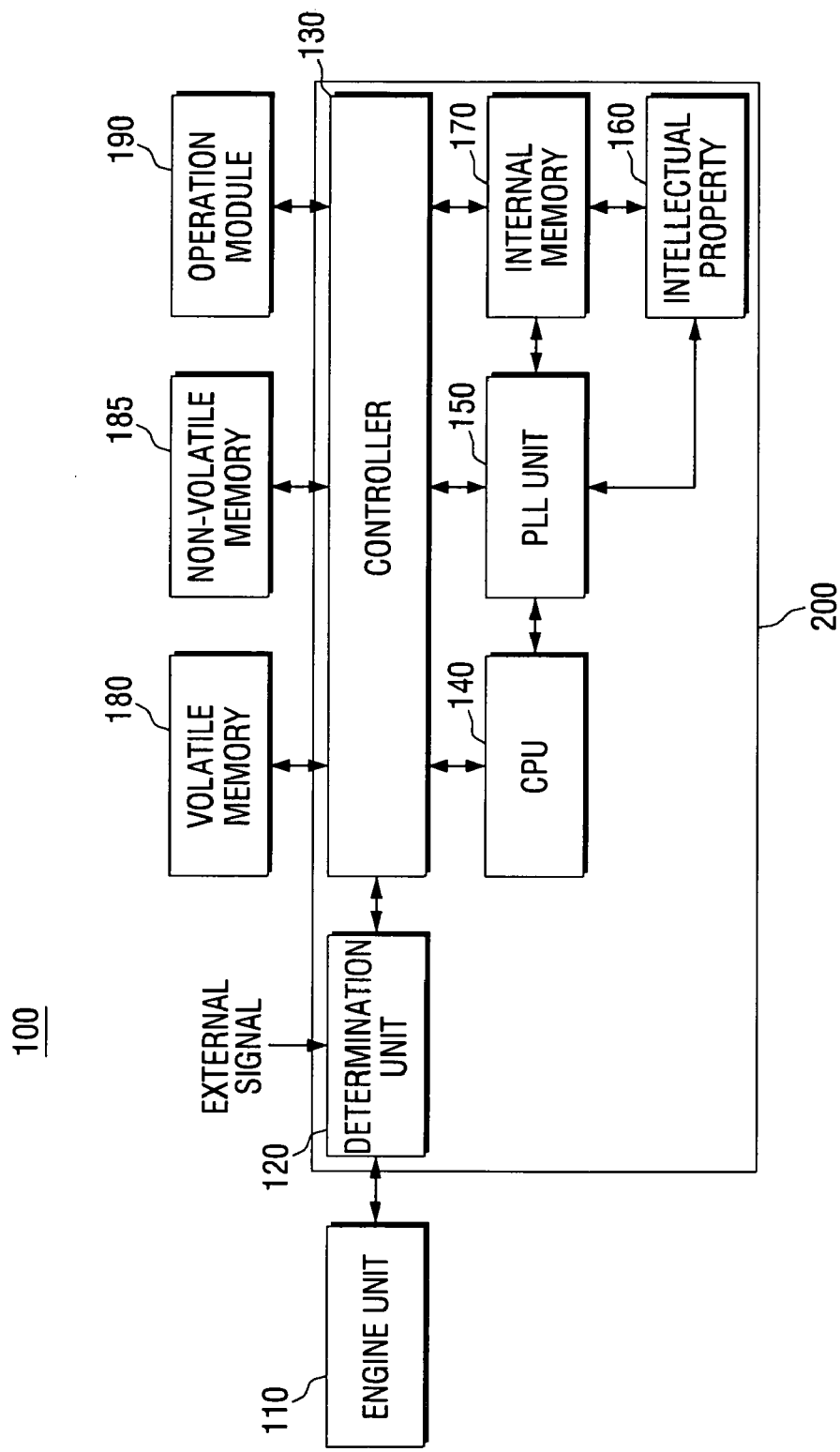
FIG. 1 is a block diagram illustrating an image forming apparatus according to an exemplary embodiment.

Reference will now be made in detail to the present embodiments, examples of which are illustrated in the accompanying drawings, wherein like reference numerals refer to the like elements throughout. The embodiments are described below by referring to the figures.

FIG. 1 is a block diagram illustrating an image forming apparatus according to an exemplary embodiment. Referring to FIG. 1, an image forming apparatus 100 includes an engine unit 110, a determination unit 120, a controller 130, a CPU 140, a phase-locked loop (PLL) unit 150, an intellectual property 160, an internal memory 170, a volatile memory 180, a non-volatile memory 185, and an operation module 190.

The determination unit 120, the controller 130, the CPU 140, the PLL unit 150, the internal memory 160, and the intellectual property 170 constitute an application-specific integrated circuit (ASIC) unit 200 to perform their associated operations. The ASIC unit 200 may be realized as a single chip such as an ASIC chip.

The engine unit 110 performs an image forming job such as printing, scanning, and copying.

The determination unit 120 determines whether the image forming apparatus 100 is in a standby state to wait for execution of an image forming job or not. The standby state may include various power saving modes according to power consumption levels. The determination unit 120 may operate even in the standby state.

If an external signal is input, the determination unit 120 may determine whether the image forming apparatus 100 is in a normal state (operation state) or not.

The determination unit 120 may include a communication interface (not shown) and the external signal may be an interrupt signal which is input from a host device (not shown) or a USB memory.

The determination unit 120 repeatedly determines whether the image forming apparatus is in the standby state or not in order to enter the various power saving modes in a stepwise manner. For example, the image forming apparatus 100 enters a first power saving mode, a second power saving mode, and a third power saving mode in a stepwise manner. In this case, the power consumption can be further reduced in the second power saving mode than in the first power saving mode and can be still further reduced in the third power saving mode than in the second power saving mode.

If it is determined that the image forming apparatus 100 is in the standby state, the controller 130 controls the image forming apparatus 100 to operate in the first power saving mode in which information stored in the volatile memory 180 is copied to the internal memory 170 and operation frequencies of the CPU 140, the volatile memory 180 and the intellectual property 160 are lowered.

As a result of repetitive determination by the determination unit 120, if it is determined that the standby state to wait for execution of an image forming job is maintained for a predetermined time after the image forming apparatus 100 operates in the first power saving mode, the controller 130 controls the image forming apparatus 100 to operate in the second power saving mode in which the CPU 140 uses the information copied to the internal memory 170 and the volatile memory 180 enters an idle mode.

As a result of repetitive determination by the determination unit 120, if it is determined that the standby state is maintained for a predetermined time after the image forming apparatus 100 operates in the second power saving mode, the controller 130 controls the image forming apparatus 100 to operate in the third power saving mode in which the power supplied to the volatile memory 180 and the operation module 190 is interrupted and the operation frequency of the CPU 140 is lowered.

If the determination unit 120 determines that the external signal indicates a normal state when the image forming apparatus 100 is in the first power saving mode, the controller 130 changes the operation frequencies of the CPU 140 and the volatile memory 180 to normal operation frequencies.

If the determination unit 120 determines that the external signal is in a normal state when the image forming apparatus 100 is in the second power saving mode, the controller 130 changes the operation frequencies of the CPU 140 and the volatile memory 180 to normal operation frequencies, and changes the mode of the volatile memory 180 from the idle mode to an operation mode.

If the determination unit 120 determines that the external signal is in a normal state when the image forming apparatus 100 is in the third power saving mode, the controller 130 changes the operation frequencies of the CPU 140 and the volatile memory 180 to normal operation frequencies, supplies power to the volatile memory 180 and the operation module 190, and copies information necessary for normal operation from the non-volatile memory 185 to the volatile memory 180.

The CPU 140 controls overall operation of the components of the ASIC chip. The controller 130 controls the operation frequency of the CPU 140 to be lowered in the first power saving mode and the third power saving mode. The operation frequency in the third power saving mode is lower than in the first power saving mode.

The PLL unit 150 generates various operation frequencies and provides them to the components of the ASIC unit 200, such as the CPU 140, the volatile memory 180, and the intellectual property 160.

The intellectual property 160, a functional device, performs various functions, such as image processing to execute an image forming job in the operation state and motor driving speed controlling. A plurality of intellectual properties 160 may be provided according to the operations to be performed.

The internal memory 170 is disposed in the ASIC unit 200. The internal memory 170 may store information necessary for executing the function of the intellectual property 160 if the image forming apparatus 100 is in the operation state to execute an image forming job. However, if the image forming apparatus is in the standby state such as the first power saving mode, the information which is stored in the volatile memory 180 in the operation state is copied to and stored in the internal memory 170.

Among the information stored in the volatile memory 180, minimum information such as information necessary for returning to the normal operation state from the standby state may be copied to the internal memory 170. Also, the information may be of diverse formats such as code, program, and data, but should not be limited to these. The internal memory 170 may be realized as a static random access memory (SRAM).

The volatile memory 180 is disposed outside the ASIC unit 200 and the CPU 140 reads out information from the volatile memory 180 and performs overall controlling operation in the operation state. In the second power saving mode, the volatile memory 180 enters a self-refresh mode, that is, an idle mode to perform refreshing by itself. Accordingly, the volatile memory 180 is not required to receive a refresh command to perform refreshing at predetermined intervals from the controller 130. The volatile memory 180 may be realized as a dynamic random access memory (DRAM).

The non-volatile memory 185 is disposed outside the ASIC unit 200 and may be realized as a read-only memory (ROM). In order to enter the operation state by supplying power to the volatile memory 180 and the operation module 190 which are turned off in the third power saving mode, the non-volatile memory 185 provides information which is necessary for entering the operation state to the volatile memory 180.

The operation module 190 may be a printing module, a scanning module, and a copying module, and also may be a module to execute an image forming job. Since the operation module 190 is not required to operate in the standby state such as the third power saving mode, the controller 130 interrupts power supplied to the operation module 190.

Figure 2:
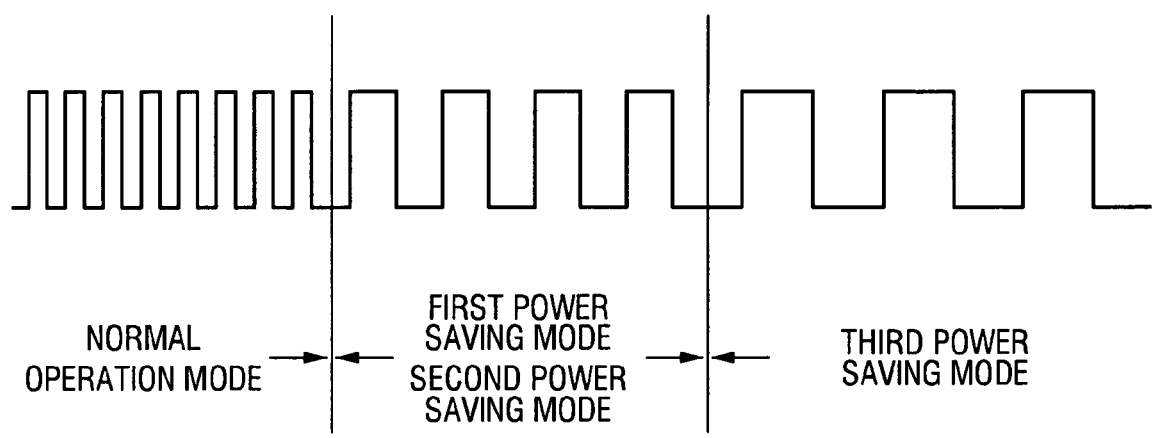
FIG. 2 is a view illustrating operation frequencies which are generated by a phase-locked loop (PLL) unit and provided to each component.

FIG. 2 is a view illustrating the operation frequencies which are generated by the PLL unit and provided to each component. Referring to FIG. 2, various operation frequencies generated by the PLL unit 150 may be applied to each component and each component operates according to the operation frequencies. In the normal operation mode, more jobs can be performed than in the first power saving mode and the second power saving mode. For example, in the normal operation mode, the number of operations of reading and writing information with respect to a rising edge is higher than in the first power saving mode and the second power saving mode. Likewise, more jobs are performed in the first and the second power saving modes than in the third power saving mode.

Figure 3:
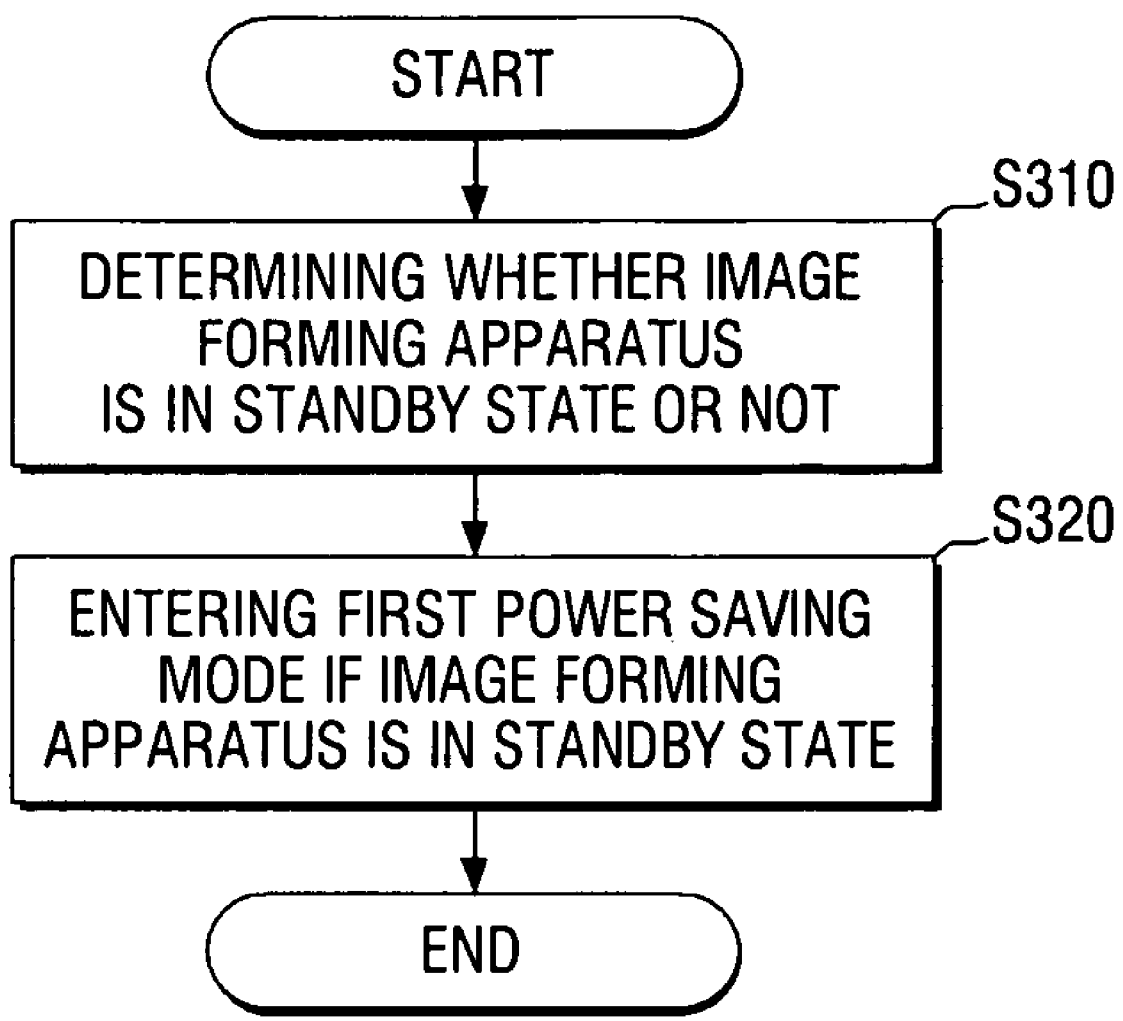
FIG. 3 is a flowchart illustrating a controlling method of an image forming apparatus according to an exemplary embodiment.

FIG. 3 is a flowchart illustrating a controlling method of an image forming apparatus according to an exemplary embodiment. The controlling method of the image forming apparatus may be performed in the ASIC unit 200 such as an ASIC chip. Referring to FIG. 3, the determination unit 120 determines whether the standby state to wait for execution of an image forming job is maintained for a predetermined time or not (S310). Operation S310 is repeatedly performed.

If it is determined that the image forming apparatus 100 is in the standby state, the image forming apparatus 100 enters the first power saving mode in which information stored in the volatile memory 180 is copied to the internal memory 170 and the operation frequencies of the CPU 140, the volatile memory 180, and the intellectual property 160 are lowered (S320). In operation S320, the operation mode in which the image forming job is executed may be converted into the first power saving mode.

Accordingly, the controlling method of the image forming apparatus repeatedly determines whether the image forming apparatus 100 is in the standby state or not, and enters different power saving modes in a stepwise manner according to the result of determination, so that power consumption can be reduced in the standby state.

Figure 4:
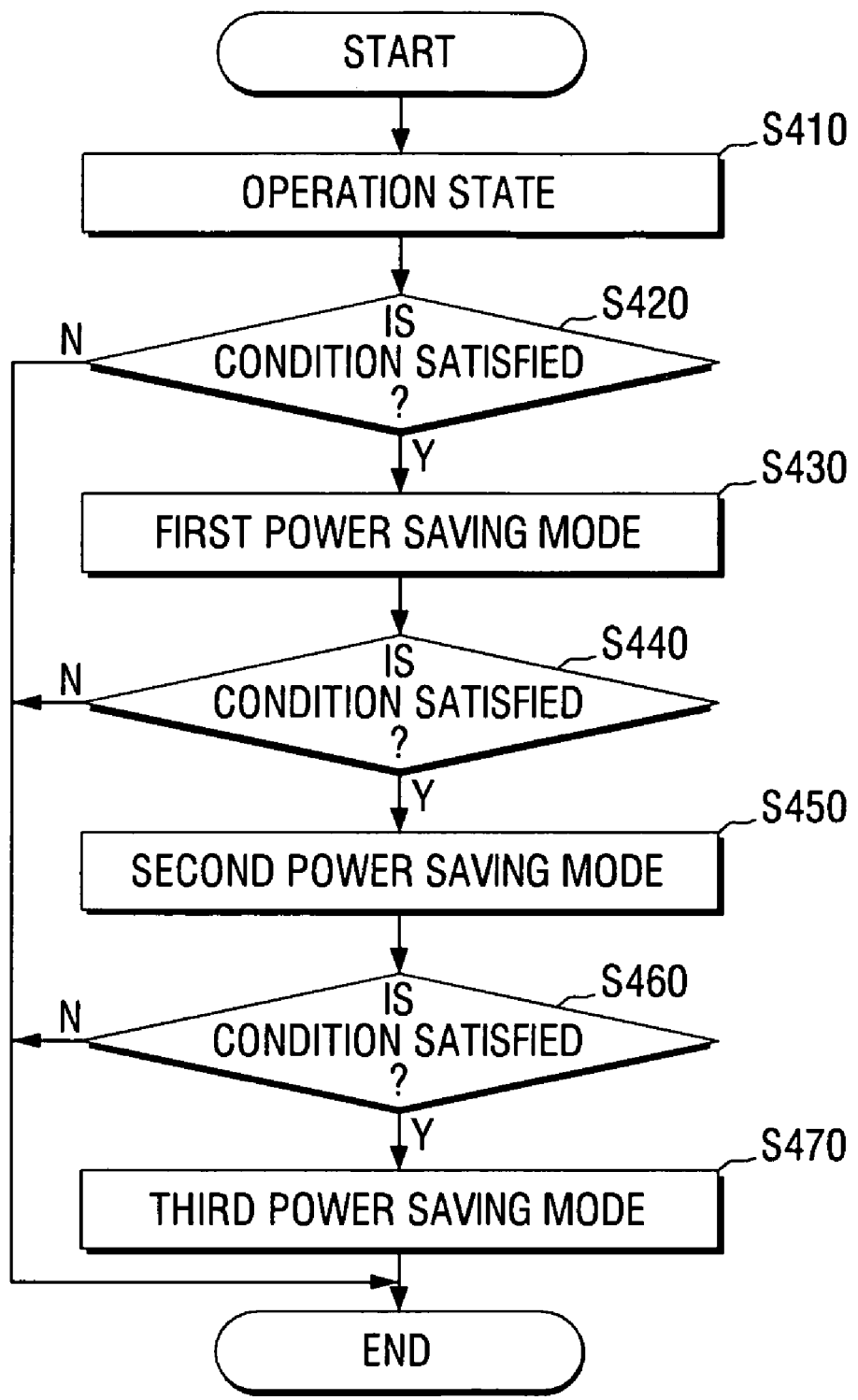
FIG. 4 is a flowchart illustrating the controlling method of FIG. 3 in more detail.

FIG. 4 is a flowchart illustrating the controlling method of the image forming apparatus of FIG. 3 in more detail. For convenience of explanation, it is assumed that the image forming apparatus 100 is in an operation state (S410).

If the image forming apparatus 100 maintains the standby state for a predetermined time after having been in the operation state, the determination unit 120 determines whether a condition for entering the first power saving mode is satisfied or not (S420).

If the condition is satisfied (S420-Y), the image forming apparatus 100 enters the first power saving mode (S430). In the first power saving mode, the information stored in the volatile memory 180 is copied to the internal memory 170 and the operation frequencies of the CPU 140, the volatile memory 180, and the intellectual property 160 are lowered under the control of the controller 130.

Since the operation frequencies of the CPU 140, the volatile memory 180, and the intellectual property 160 are lowered to the minimum frequency that can allow the volatile memory 180 to operate, power consumption of each component can be further reduced.

After entering the first power saving mode, if the image forming apparatus 100 maintains the standby state for a predetermined time, the determination unit 120 determines whether a condition for entering the second power saving mode is satisfied or not (S440).

If the condition is satisfied (S440-Y), the image forming apparatus 100 operates in the second power saving mode (S450). In the second power saving mode, the CPU 140 which has read out information from the volatile memory 180 is set to use the information copied to the internal memory 170, and the volatile memory 180 enters the idle mode, under the control of the controller 130.

Accordingly, since the CPU 140 which has read out information from the volatile memory 180 uses the minimum information copied to the internal memory 170, power consumption can be further reduced. Also, if the volatile memory 180 enters the idle mode, it is not necessary to receive a refresh command to perform refreshing at predetermined intervals from the controller 130 and thus power consumption can be further reduced.

After entering the second power saving mode, if the image forming apparatus 100 maintains the standby state for a predetermined time, the determination unit 130 determines whether a condition for entering the third power saving mode is satisfied or not (S460).

If the condition is satisfied (S460-Y), the image forming apparatus 100 operates in the third power saving mode (S470). In the third power saving mode, the power supplied to the volatile memory 180 and the operation module 190 is interrupted the operation frequency of the CPU 140 is lowered, under the control of the controller 130.

Since the power supplied to the volatile memory 180 and the operation module 190 is interrupted, power consumption can be further reduced. Also, the operation frequency of the CPU 140 can be lowered to the minimum frequency that can allow the CPU 140 to operate. The minimum frequency that can allow the CPU 140 to operate is lower than the minimum frequency that can allow the volatile memory 180 to operate in the first power saving mode.

As described above, the image forming apparatus 100 enters the first power saving mode, the second power saving mode, and the third power saving mode, which have different power consumption levels, in a stepwise manner, and optimizes the power consumption according to each mode, so that the power consumption can be reduced in the standby mode of the image forming apparatus 100.

The predetermined time set in operations S420, S440, and S460 may be different from or equal to one another.

Although the first power saving mode, the second power saving mode, and the third power saving mode are performed in sequence according to the controlling method of the image forming apparatus of FIG. 4, this should not be considered as limiting. That is, if only the level of saved power can be adjusted in a stepwise manner, various embodiments can be applied. For example, the image forming apparatus 100 may directly enter the third power saving mode from the first power saving mode or may enter the third power saving mode after performing the first power saving mode and the second power saving mode simultaneously.

Figure 5:
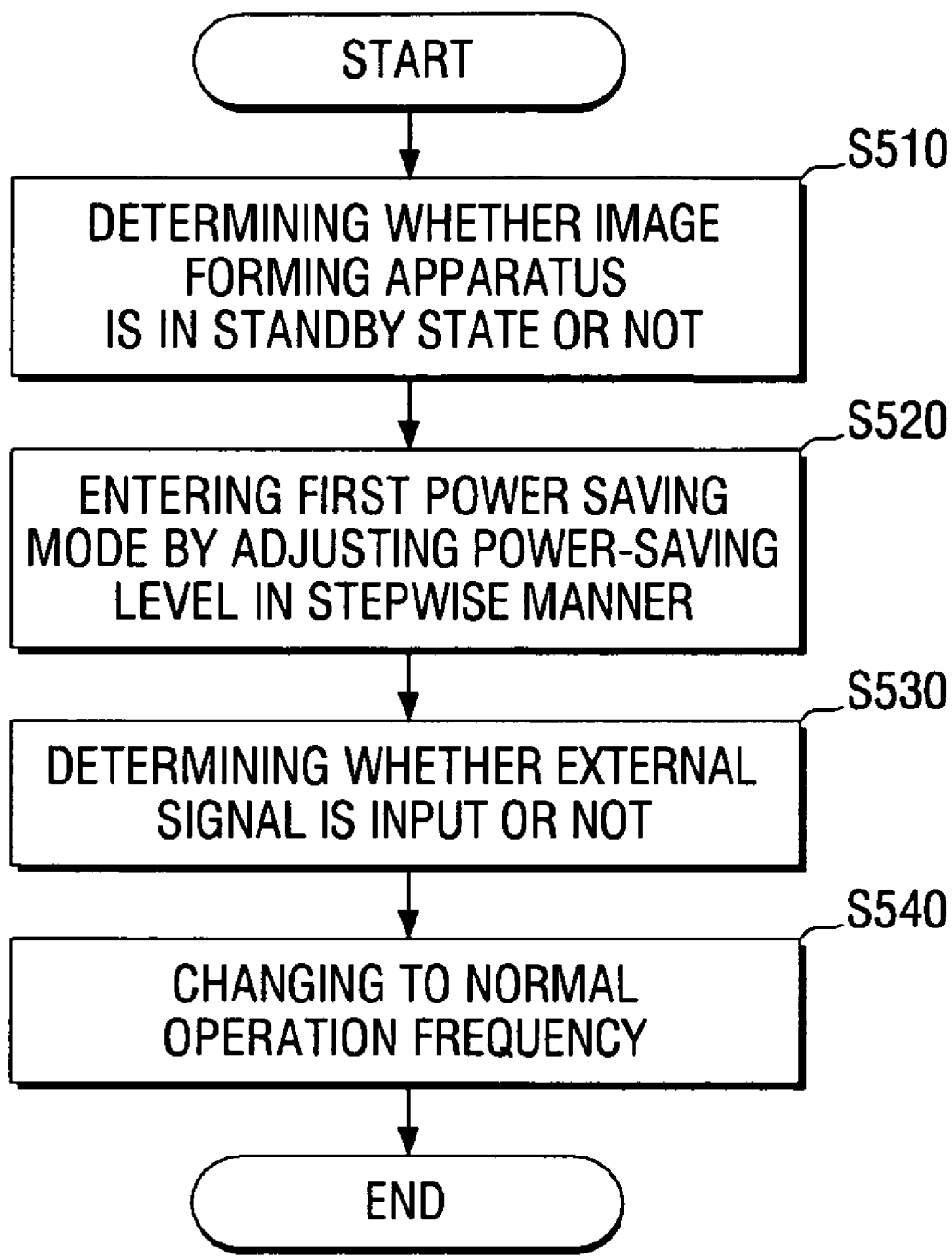
FIG. 5 is a flowchart illustrating a controlling method of an image forming apparatus according to another exemplary embodiment.

FIG. 5 is a flowchart illustrating a controlling method of an image forming apparatus according to another exemplary embodiment.

Referring to FIG. 5, the determination unit 120 repeatedly determines whether a standby state to wait for execution of an image forming job is maintained for a predetermined time or not (S510).

The controller 130 controls the image forming apparatus 100 to enter the first power saving mode by adjusting a power-saving level in a stepwise manner according to the result of repetitive determination (S520). More specifically, in operation S520, the normal state is converted into the standby state of the first power saving mode in which the controller 130 controls a code stored in the volatile memory 180 in the normal state to be copied to the internal memory 170 and the operation frequency of each component to be lowered.

It is determined whether an external signal requesting the image forming apparatus 100 to operate in the normal state to perform an image forming job is input or not (S530).

If it is determined that the external signal is input, the operation frequencies of the CPU 140 and the volatile memory 180 are changed to normal operation frequencies (S540).

Figure 6:
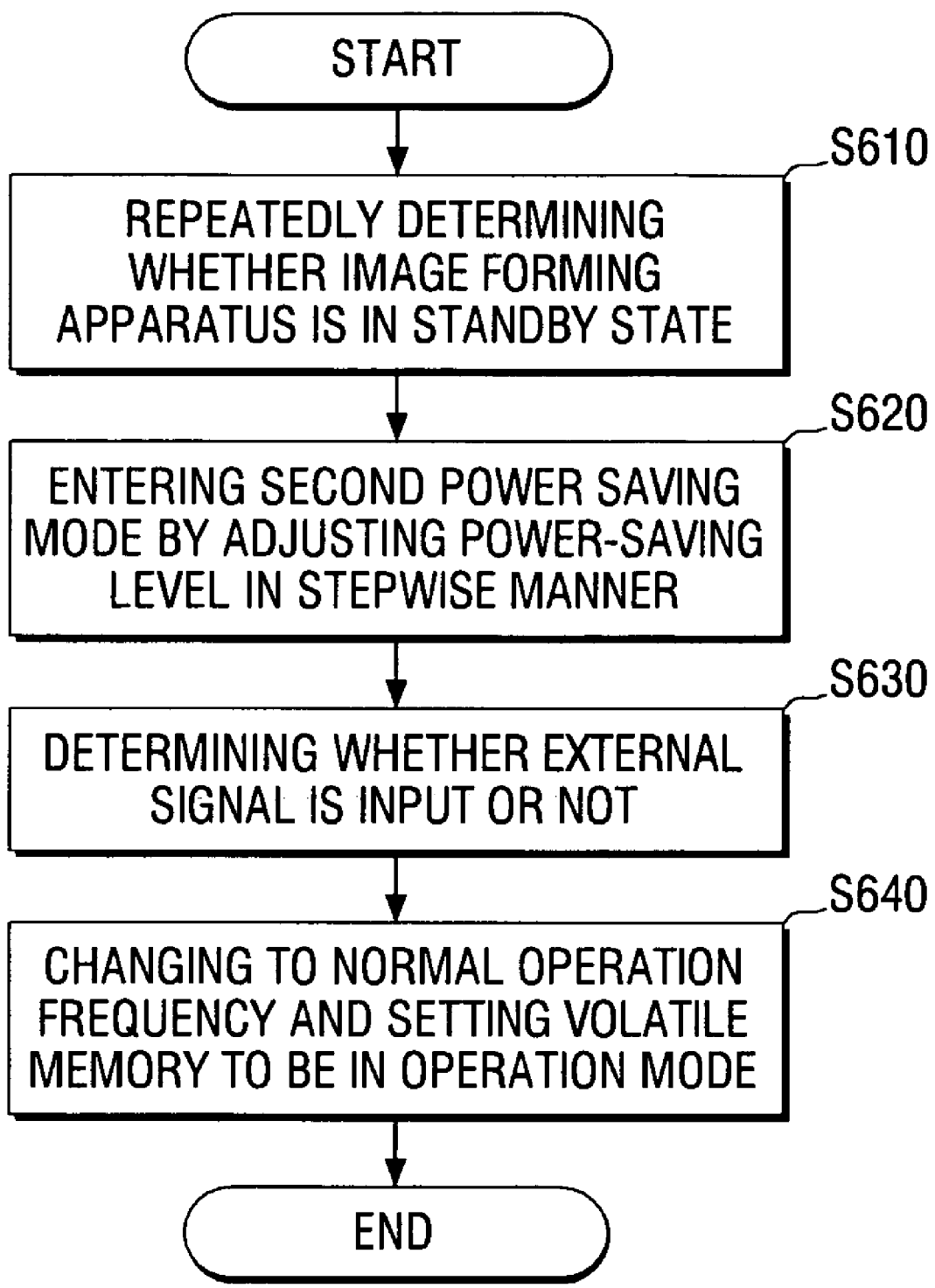
FIG. 6 is a flowchart illustrating a controlling method of an image forming apparatus according to still another exemplary embodiment.

FIG. 6 is a flowchart illustrating a controlling method of an image forming apparatus according to still another exemplary embodiment.

Referring to FIG. 6, the determination unit 120 repeatedly determines whether a standby state to wait for execution of an image forming job is maintained for a predetermined time or not (S610).

The controller 130 controls the image forming apparatus to enter the second power saving mode by adjusting a power-saving level in a stepwise manner according to the result of repetitive determination (S620). More specifically, in operation S620, after the normal state is converted into the first power saving mode, the first power saving mode is converted into the second power saving mode in which the CPU 140 is set to use information copied to the internal memory 170 (program jump) and the volatile memory 180 enters the self-refresh mode.

It is determined whether an external signal requesting the image forming apparatus 100 to operate in the normal state to perform an image forming job is input or not (S630).

If it is determined that the external signal is input, the operation frequencies of the CPU 140 and the volatile memory 180 are changed to normal operation frequencies, and the volatile memory 180 operates in the normal operation mode (S640).

Figure 7:
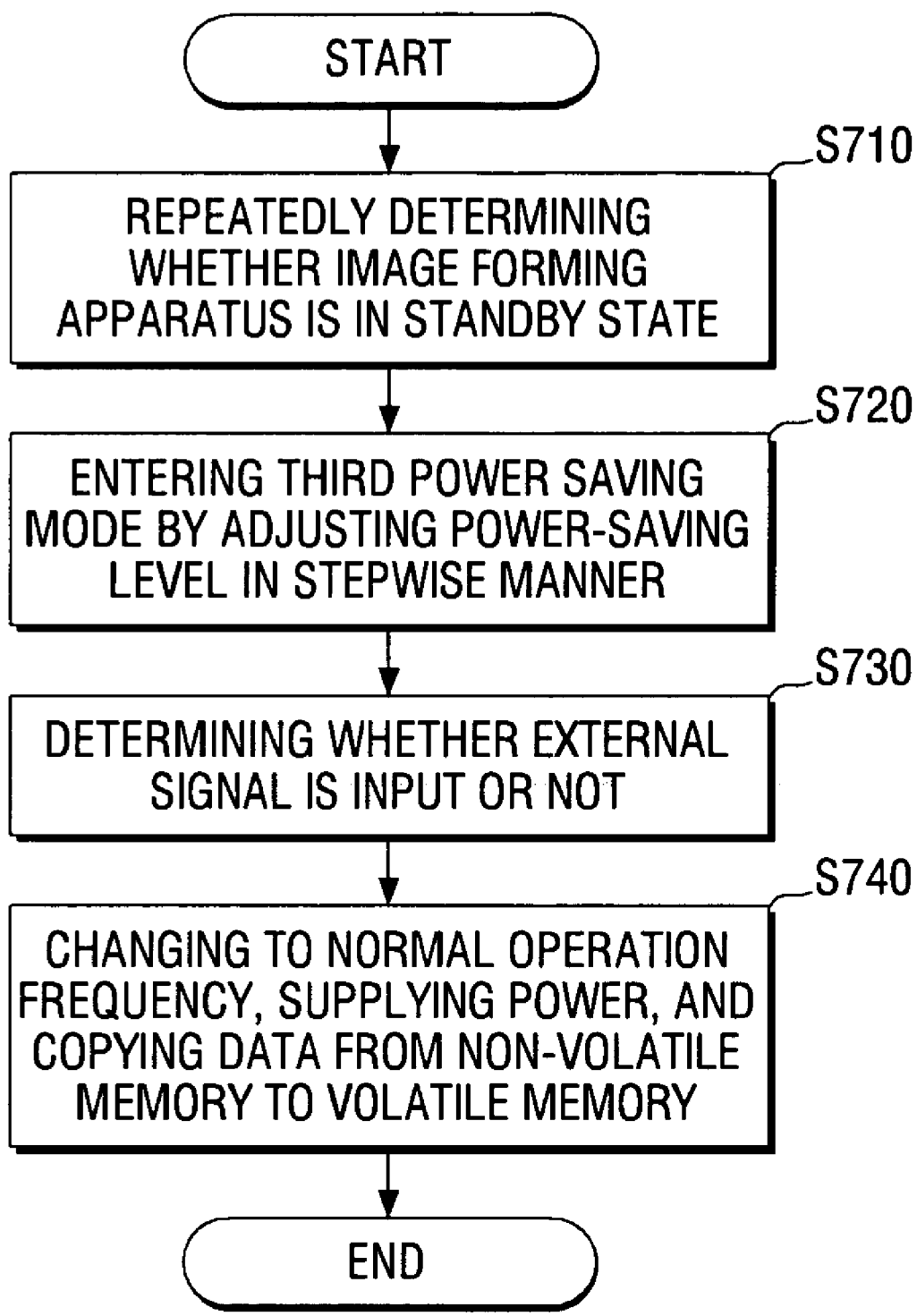
FIG. 7 is a flowchart illustrating a controlling method of an image forming apparatus according to still another exemplary embodiment.

FIG. 7 is a flowchart illustrating a controlling method of an image forming apparatus according to still another exemplary embodiment.

Referring to FIG. 7, the determination unit 120 repeatedly determines whether a standby state to wait for execution of an image forming job is maintained for a predetermined time or not (S710).

The controller 130 controls the image forming apparatus to enter the third power saving mode by adjusting a power-saving level in a stepwise manner according to the result of repetitive determination (S720). More specifically, in operation S720, after the first power saving mode is converted into the second power saving mode, the second power saving mode is converted into the third power saving mode in which the power supplied to the volatile memory 180 and the operation module 190 is interrupted and the operation frequency of the CPU 140 is lowered.

It is determined whether an external signal requesting the image forming apparatus to operate in the normal state to perform an image forming job is input or not (S730).

If it is determined that the external signal is input, the operation frequencies of the CPU 140 and the volatile memory 180 are changed to normal operation frequencies, power is supplied to the volatile memory 180 and the operation module 190, and information is copied from the non-volatile memory 185 to the volatile memory 180 (S740). The information copied to the volatile memory 180 in operation S740 may be data or code which has been pre-stored in the non-volatile memory 185 to allow the image forming apparatus 100 to operate in the normal state.

The embodiments include a computer readable recording medium which includes a program for executing the controlling method of the image forming apparatus described above. The computer readable recording medium includes all kinds of recording devices which store data readable by a computer system. Examples of the computer readable recording medium are a ROM, a RAM, a CD-ROM, a magnetic tape, a floppy disk, and an optical data storage device. Also, the computer readable recording medium may store or execute a code which is distributed over a computer system connected to a network and is readable by a computer in a distributed manner.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:
   an engine unit to execute an image forming job;
   a determination unit to determine whether the image forming apparatus is in a standby state or not, based on whether the standby state to wait for execution of the image forming job is maintained for a predetermined time or not; and
   a controller to control the image forming apparatus to operate in a first power saving mode if it is determined that the image forming apparatus is in the standby state,
   wherein, in the first power saving mode, information stored in a volatile memory is copied to an internal memory and operation frequencies of a central processing unit (CPU), the volatile memory, and an intellectual property are lowered.

2. The image forming apparatus as claimed in claim 1, wherein the determination unit repeatedly determines whether the image forming apparatus is in the standby state or not.

3. The image forming apparatus as claimed in claim 2, wherein, according to the repetitive determination, if it is determined that the standby state to wait for execution of the image forming job is maintained for a predetermined time after the image forming apparatus operates in the first power saving mode, the controller controls the image forming apparatus to operate in a second power saving mode in which the CPU is set to use the information copied to the internal memory and the volatile memory enters an idle mode.

4. The image forming apparatus as claimed in claim 3, wherein, according to the repetitive determination, if it is determined that the standby state to wait for execution of the image forming job is maintained for a predetermined time after the image forming apparatus operates in the second power saving mode, the controller controls the image forming apparatus to operate in a third power saving mode in which power supplied to the volatile memory and an operation module is interrupted and the operation frequency of the CPU is lowered.

5. The image forming apparatus as claimed in claim 1, further comprising a phase-locked loop (PLL) unit to generate operation frequency and provide the operation frequency to the CPU, the volatile memory, and the intellectual property.

6. The image forming apparatus as claimed in claim 1, wherein the internal memory is a memory that stores information necessary for driving the intellectual property in a normal state in which the image forming job is executed, and, in the first power saving mode, information stored in the volatile memory of the normal state is copied to the internal memory.

7. The image forming apparatus as claimed in claim 1, wherein the determination unit determines whether an external signal requesting the image forming apparatus to operate in a normal state to execute the image forming job is input or not, wherein, if it is determined that the external signal indicates the normal state, the controller changes the operation frequencies of the CPU and the volatile memory to normal operation frequencies in response to the external signal.

8. The image forming apparatus as claimed in claim 3, wherein the determination unit determines whether an external signal requesting the image forming apparatus to operate in a normal state to execute the image forming job is input or not, wherein, if it is determined that the external signal indicates the normal state, the controller changes the operation frequencies of the CPU and the volatile memory to normal operation frequencies, and sets the volatile memory to be in an operation mode in response to the external signal.

9. The image forming apparatus as claimed in claim 4, wherein the determination unit determines whether an external signal requesting the image forming apparatus to operate in a normal state to execute the image forming job is input or not, wherein, if it is determined that the external signal indicates the normal state, the controller changes the operation frequencies of the CPU and the volatile memory to normal operation frequencies, supplies power to the volatile memory and the operation module, and copies information necessary for operating in the normal state from the non-volatile memory to the volatile memory.

10. A controlling method of an image forming apparatus, the method comprising:
    determining whether the image forming apparatus is in a standby state or not, based on whether the standby state to wait for execution of an image forming job is maintained for a predetermined time or not; and
    if it is determined that the image forming apparatus is in the standby state, entering a first power saving mode in which information stored in a volatile memory is copied to an internal memory and operation frequencies of a CPU, the volatile memory, and an intellectual property are lowered.

11. The controlling method as claimed in claim 10, wherein in the determining operation, it is repeatedly determined whether the image forming apparatus is in the standby state or not.

12. The controlling method as claimed in claim 11, wherein, according to the repetitive determination, if it is determined that the standby state to wait for execution of the image forming job is maintained for a predetermined time after the image forming apparatus operates in the first power saving mode, the entering comprises entering a second power saving mode in which the CPU is set to use the information copied to the internal memory and the volatile memory enters an idle mode.

13. The controlling method as claimed in claim 12, wherein, according to the repetitive determination, if it is determined that the standby state to wait for execution of the image forming job is maintained for a predetermined time after the image forming apparatus operates in the second power saving mode, the entering comprises entering a third power saving mode in which power supplied to the volatile memory and an operation module is interrupted and the operation frequency of the CPU is lowered.

14. The controlling method as claimed in claim 10, wherein the internal memory is a memory that stores information necessary for driving the intellectual property in a normal state in which the image forming job is executed, and, in the first power saving mode, information stored in the volatile memory is copied to the internal memory.

15. The controlling method as claimed in claim 10, further comprising: determining whether an external signal requesting the image forming apparatus to operate in a normal state to execute the image forming job is input or not; and if it is determined that the external signal indicates the normal state, changing the operation frequencies of the CPU and the volatile memory to normal operation frequencies in response to the external signal.

16. The controlling method as claimed in claim 12, further comprising:
   determining whether an external signal requesting the image forming apparatus to operate in a normal state to execute the image forming job is input or not; and
   if it is determined that the external signal indicates the normal state, changing the operation frequencies of the CPU and the volatile memory to normal operation frequencies, and setting the volatile memory to be in an operation mode in response to the external signal.

17. The controlling method as claimed in claim 13, further comprising:
   determining whether an external signal requesting the image forming apparatus to operate in a normal state to execute the image forming job is input or not; and
   if it is determined that the external signal indicates the normal state, changing the operation frequencies of the CPU and the volatile memory to normal operation frequencies, supplying power to the volatile memory and the operation module, and copying information from the non-volatile memory to the volatile memory.

18. A method of controlling an image forming apparatus including an operation module, an internal memory, and components including a volatile memory, a central processing unit (CPU) and an intellectual property, the method comprising:
   repeatedly determining whether a standby state to wait for execution of an image forming job is maintained for a predetermined time or not;
   controlling the image forming apparatus to enter a first power saving mode by adjusting a power-saving level downward in a stepwise manner according to the result of the repetitive determination;
   repeatedly determining whether a standby state to wait for execution of an image forming job is maintained for a predetermined time or not;
   controlling the image forming apparatus to enter a second power saving mode by adjusting a power-saving level further downward in a stepwise manner according to the result of repetitive determination;
   repeatedly determining whether a standby state to wait for execution of an image forming job is maintained for a predetermined time or not;
   controlling the image forming apparatus to enter a third power saving mode by adjusting a power-saving level still further downward in a stepwise manner according to the result of repetitive determination.

19. The method of claim 18, wherein controlling the image forming apparatus to enter the first power saving mode comprises copying information stored in the volatile memory to the internal memory and lowering operation frequencies of the CPU, volatile memory and intellectual property.

20. The method of claim 19, wherein controlling the image forming apparatus to enter the second power saving mode comprises the CPU using information copied to the internal memory and the volatile memory entering a self-refresh mode.

21. The method of claim 20, wherein controlling the image forming apparatus to enter the third power saving mode comprises:
   interrupting power supplied to the volatile memory and the operation module; and
   further lowering the operation frequency of the CPU.

* * * * *

UNITED STATES PATENT AND TRADEMARK OFFICE
CERTIFICATE OF CORRECTION

PATENT NO. : 8,339,626 B2  Page 1 of 1
APPLICATION NO. : 12/659731
DATED : December 25, 2012
INVENTOR(S) : Man-suk Park et al.

It is certified that error appears in the above-identified patent and that said Letters Patent is hereby corrected as shown below:

Title Page Col. 1, insert item
--(30)    Foreign Application Priority Data
  Sep. 8, 2009      (KR) .............................. 10-2009-84312--

Signed and Sealed this
Fifth Day of November, 2013

Teresa Stanek Rea
*Deputy Director of the United States Patent and Trademark Office*